(12) United States Patent
Wada

(10) Patent No.: US 8,324,524 B2
(45) Date of Patent: Dec. 4, 2012

(54) PLASMA WELDING PROCESS AND OUTER GAS FOR USE IN THE PLASMA WELDING PROCESS

(75) Inventor: Katsunori Wada, Kai (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 85 days.

(21) Appl. No.: 12/933,954

(22) PCT Filed: Mar. 24, 2009

(86) PCT No.: PCT/JP2009/055786
§ 371 (c)(1),
(2), (4) Date: Sep. 22, 2010

(87) PCT Pub. No.: WO2009/119561
PCT Pub. Date: Oct. 1, 2009

(65) Prior Publication Data
US 2011/0017712 A1    Jan. 27, 2011

(30) Foreign Application Priority Data

Mar. 26, 2008  (JP) ................................ 2008-080650
Feb. 6, 2009   (JP) ................................ 2009-026121

(51) Int. Cl.
*B23K 10/00*    (2006.01)
(52) U.S. Cl. .......... 219/121.46; 219/121.59; 219/121.55
(58) Field of Classification Search ............. 219/121.45, 219/121.46, 121.55, 121.5, 121.51, 74, 75, 219/137 R
See application file for complete search history.

(56) References Cited

U.S. PATENT DOCUMENTS

| 4,162,389 A * | 7/1979 | Shimdada et al. ........ 219/121.45 |
| 5,938,948 A * | 8/1999 | Oros et al. ............... 219/121.46 |
| 6,281,464 B1 * | 8/2001 | Topper ............................ 219/75 |
| 6,392,184 B1 * | 5/2002 | Yokota et al. ................... 219/74 |

FOREIGN PATENT DOCUMENTS

| CN | 1403239 A | 3/2003 |
| JP | 2003-311414 | 11/2003 |
| JP | 2004-298963 | 10/2004 |
| JP | 2006-26644 | 2/2006 |

OTHER PUBLICATIONS

International Search Report for PCT/JP2009/055786, mailed May 19, 2009.
Notification of First Office Action and English translation in CN 200980110242.3 dated Jul. 3, 2012.

* cited by examiner

*Primary Examiner* — Mark Paschall
(74) *Attorney, Agent, or Firm* — Nixon & Vanderhye P.C.

(57) ABSTRACT

An outer gas for plasma welding of the present invention is used in plasma welding of a stainless steel with use of a plasma welding torch in which an insert tip (2) is provided in the periphery of a tungsten electrode (1), a shield cap (3) is provided in the periphery of this insert tip (2), a front end part of the tungsten electrode (1) is located inside from a front end part of the insert tip (2), a center gas comprising an inert gas is allowed to flow into a gap between the tungsten electrode (1) and the insert tip (2), and the outer gas is allowed to flow into a gap between the insert tip (2) and the shield cap (3), wherein the outer gas is a mixed gas containing 0.5 to 2% by volume of a carbon dioxide gas with the balance of an inert gas.

8 Claims, 4 Drawing Sheets

FIG. 2

| GAS SPECIES | TOP: SURFACE BEAD APPEARANCE<br>BOTTOM: PENETRATION BEAD APPEARANCE | PASS OR FAIL |
|---|---|---|
| CENTER GAS: Ar<br>OUTER GAS: Ar<br>(CONVENTIONAL WELDING) |  | FAIL |
| CENTER GAS: Ar<br>OUTER GAS: Ar − 0.5% $CO_2$ |  | PASS |
| CENTER GAS: Ar<br>OUTER GAS: Ar − 1% $CO_2$ |  | PASS |
| CENTER GAS: Ar<br>OUTER GAS: Ar − 2% $CO_2$ |  | PASS |
| CENTER GAS: Ar<br>OUTER GAS: Ar − 3% $CO_2$ |  | FAIL |
| CENTER GAS: Ar<br>OUTER GAS: Ar − 0.5% $O_2$ |  | FAIL |
| CENTER GAS: Ar<br>OUTER GAS: Ar − 1% $O_2$ |  | FAIL |
| CENTER GAS: Ar + 7% $H_2$<br>OUTER GAS: Ar − 7% $H_2$<br>(CONVENTIONAL WELDING) |  | FAIL |

FIG. 3
| | GAS SPECIES | PHOTOGRAPH OF PENETRATION BEAD APPEARANCE | PASS OR FAIL |
|---|---|---|---|
| 1 | 100% Ar | 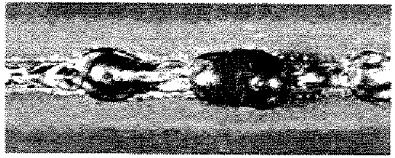 | FAIL |
| 2 | Ar + 0.5% $O_2$ | 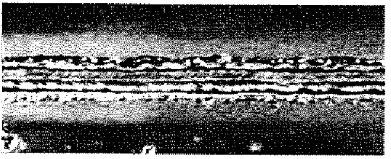 | PASS |
| 3 | Ar + 1% $O_2$ |  | PASS |
| 4 | Ar + 2% $O_2$ | 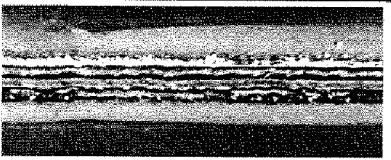 | PASS |
| 5 | Ar + 3% $O_2$ |  | PASS |
| 6 | Ar + 4% $O_2$ |  | PASS |
| 7 | Ar + 5% $O_2$ |  | PASS |
| 8 | Ar + 6% $O_2$ |  | PASS |
| 9 | Ar + 7% $O_2$ |  | FAIL |

FIG. 4

| | GAS SPECIES | PHOTOGRAPH OF PENETRATION BEAD APPEARANCE | PASS OR FAIL |
|---|---|---|---|
| 10 | Ar + 0.5% $CO_2$ | | PASS |
| 11 | Ar + 1% $CO_2$ | | PASS |
| 12 | Ar + 2% $CO_2$ | | PASS |
| 13 | Ar + 3% $CO_2$ | | FAIL |

PLASMA WELDING PROCESS AND OUTER GAS FOR USE IN THE PLASMA WELDING PROCESS

This application is the U.S. national phase of International Application No. PCT/JP2009/055786, filed 24 Mar. 2009, and claims priority to Japan Application No. 2008-080650, filed 26 Mar. 2008; and Japan Application No. 2009-026121, filed 6 Feb. 2009, the entire contents of each of which is hereby incorporated by reference.

TECHNICAL FIELD

The present invention relates to a plasma welding process and an outer gas for use in the plasma welding process, in particular to a plasma welding process and an outer gas with which a stable penetration bead can be created even in a thick material to be welded.

Priority is claimed on Japanese Patent Application No. 2008-080650, filed Mar. 26, 2008, and Japanese Patent Application No. 2009-026121, filed Feb. 6, 2009, the contents of which are incorporated herein by reference.

BACKGROUND ART

A plasma welding process is classified in the category of non-consumable electrode welding processes, as well as a TIG welding process. The plasma welding process offers a greater heat concentration as compared to the TIG welding process, and thus is capable of a high speed welding with a narrow bead width and less distortion.

Moreover, the plasma welding process is capable of keyhole welding which is a one-side penetration welding process by using a plasma arc of a high energy density.

Examples of the TIG welding process are described in Patent Documents 1 to 3.

In the keyhole welding, a plasma arc pushes away the molten metal and penetrates the base material to thereby create a keyhole. This keyhole becomes a weld bead after the molten metal moves backward to create a molten pool along the wall as the weld travels further.

For this reason, the thickness possible with one-side one-pass welding of an I-type groove (square groove) butt is about 0.6 to 6 mm when using a carbon steel plate, and about 0.1 to 8 mm when using a stainless steel plate.

FIG. 1 schematically shows an example of a welding torch for use in such a plasma welding process.

Reference symbol 1 in FIG. 1 denotes a tungsten electrode. This tungsten electrode 1 is formed of rod-shaped tungsten with or without a small amount of an oxide of a rare earth element such as lanthanum oxide.

This tungsten electrode 1 is surrounded by an insert tip 2. This insert tip 2 forms a pipe-like shape and is provided coaxially to the tungsten electrode 1 with a gap therebetween. In addition, the insert tip 2 can be cooled by cooling water (not shown) circulating therein.

The insert tip 2 is further surrounded by a shield cap 3. This shield cap 3 forms a pipe-like shape and is provided coaxially to the insert tip 2 with a gap therebetween.

The structure is such that a center gas comprising an inert gas such as argon or helium is allowed to flow into the gap between the tungsten electrode 1 and the insert tip 2, and an outer gas comprising a mixed gas in which 3 to 7% by volume of hydrogen is added to an inert gas such as argon or helium, is allowed to flow into the gap between the insert tip 2 and the shield cap 3.

The center gas functions as a plasma gas and the outer gas functions as a shielding gas.

In addition, the structure is such that an electrical current from a pilot are power source 4 is applied to the tungsten electrode 1 and the insert tip 2 to ignite the preliminary plasma, and subsequently an electrical current from a main arc power source 5 is applied to the tungsten electrode 1 and a material 6 to be welded so that the plasma arc can flow from the tungsten electrode 1 to the material 6 to be welded.

Furthermore, the front end part of the tungsten electrode 1 is located inside from the front end part of the insert tip 2, so that it does not protrude to the outside of the front end part of the insert tip 2.

By so doing, the tungsten electrode 1 can be enclosed by the center gas comprising an inert gas, in a state of not being exposed to any oxidizing gas. Thus, the tungsten electrode 1 will not be oxidized nor exhausted upon welding. In addition, no sputter is generated, and long-term high quality welds can be produced. Furthermore, the running cost can be reduced.

For this reason, the plasma welding process has been used in a wide range of welding procedures mostly for producing pressure vessels, pipes, and joints.

However, in a conventional plasma welding process, it has been difficult to stably create a penetration bead upon welding of a stainless steel having a thickness of 8 mm or thicker, or a carbon steel having a thickness of 6 mm or thicker, which leads to a problem in that, due to the influence of gravity, the molten metal can not bear its own weight and the shape of the penetration bead can not remain stable. For this reason, a backing metal is applied to the backside of the part to be welded upon welding.

Moreover, if the penetration bead can not remain stable, the finish of the surface bead is affected, which leads to an inconvenient situation in that readjustment has to be done.

[Patent Document 1] Japanese Unexamined Patent Application, First Publication No. 2003-311414

[Patent Document 2]: Japanese Unexamined Patent Application, First Publication No. 2006-26644

[Patent Document 3] Japanese Unexamined Patent Application, First Publication No. 2004-298963

DISCLOSURE OF INVENTION

Problems to be Solved by the Invention

Thus it is an object of this invention to weld, by the plasma welding process, a stainless steel having a thickness of 8 mm or thicker, or a carbon steel having a thickness of 6 mm or thicker, so as to form a stable and favorable penetration bead.

Means to Solve the Problems

In order to solve the aforementioned problem, a first aspect of the present invention is an outer gas for plasma welding which is used in plasma welding of a stainless steel with use of a plasma welding torch in which an insert tip is provided in the periphery of a tungsten electrode, a shield cap is provided in the periphery of this insert tip, a front end part of the tungsten electrode is located inside from a front end part of the insert tip, a center gas comprising an inert gas is allowed to flow into a gap between the tungsten electrode and the insert tip, and the outer gas is allowed to flow into a gap between the insert tip and the shield cap, wherein the outer gas is a mixed gas containing 0.5 to 2% by volume of a carbon dioxide gas with the balance of an inert gas.

A second aspect of the present invention is a plasma welding process comprising a step of conducting plasma welding of a stainless steel with use of a plasma welding torch in which an insert tip is provided in the periphery of a tungsten electrode, a shield cap is provided in the periphery of this insert tip, a front end part of the tungsten electrode is located inside from a front end part of the insert tip, a center gas is allowed to flow into a gap between the tungsten electrode and the insert tip, and an outer gas is allowed to flow into a gap between the insert tip and the shield cap, wherein an inert gas is used as the center gas, and a mixed gas containing 0.5 to 2% by volume of a carbon dioxide gas with the balance of an inert gas is used as the outer gas, when conducting the plasma welding.

In the present invention, it is preferable that a material to be welded is not applied with any backing metal during plasma welding.

A third aspect of the present invention is an outer gas for plasma welding which is used in plasma keyhole welding of a carbon steel with use of a plasma welding torch in which an insert tip is provided in the periphery of a tungsten electrode, a shield cap is provided in the periphery of this insert tip, a front end part of the tungsten electrode is located inside from a front end part of the insert tip, a center gas comprising an inert gas is allowed to flow into a gap between the tungsten electrode and the insert tip, and the outer gas is allowed to flow into a gap between the insert tip and the shield cap, wherein the outer gas is a mixed gas containing 0.5 to 2% by volume of a carbon dioxide gas with the balance of argon.

A fourth aspect of the present invention is an outer gas for plasma welding which is used in plasma keyhole welding of a carbon steel with use of a plasma welding torch in which an insert tip is provided in the periphery of a tungsten electrode, a shield cap is provided in the periphery of this insert tip, a front end part of the tungsten electrode is located inside from a front end part of the insert tip, a center gas comprising an inert gas is allowed to flow into a gap between the tungsten electrode and the insert tip, and the outer gas is allowed to flow into a gap between the insert tip and the shield cap, wherein the outer gas is a mixed gas containing 0.5 to 6% by volume of oxygen with the balance of argon.

A fifth aspect of the present invention is a plasma welding process comprising a step of conducting plasma keyhole welding of a carbon steel with use of a plasma welding torch in which an insert tip is provided in the periphery of a tungsten electrode, a shield cap is provided in the periphery of this insert tip, a front end part of the tungsten electrode is located inside from a front end part of the insert tip, a center gas is allowed to flow into a gap between the tungsten electrode and the insert tip, and an outer gas is allowed to flow into a gap between the insert tip and the shield cap, wherein an inert gas is used as the center gas, and a mixed gas containing 0.5 to 2% by volume of a carbon dioxide gas with the balance of argon is used as the outer gas, when conducting the plasma keyhole welding.

A sixth aspect of the present invention is a plasma welding process comprising a step of conducting plasma keyhole welding of a carbon steel with use of a plasma welding torch in which an insert tip is provided in the periphery of a tungsten electrode, a shield cap is provided in the periphery of this insert tip, a front end part of the tungsten electrode is located inside from a front end part of the insert tip, a center gas is allowed to flow into a gap between the tungsten electrode and the insert tip, and an outer gas is allowed to flow into a gap between the insert tip and the shield cap, wherein an inert gas is used as the center gas, and a mixed gas containing 0.5 to 6% by volume of oxygen with the balance of argon is used as the outer gas, when conducting the plasma keyhole welding.

In the present invention, it is preferable that the material to be welded is not applied with any backing metal during plasma keyhole welding.

Effect of the Invention

According to the first and second aspects of the present invention, since plasma welding of a stainless steel is conducted by using a welding torch in which a center gas comprising an inert gas is allowed to flow and a mixed gas containing 0.5 to 2% by volume of a carbon dioxide gas in an inert gas is allowed to flow as an outer gas, a deep weld can be created and the penetration bead can be stabilized. For this reason, there is no need of applying a backing metal, and a stainless steel material having a thickness of 8 mm to 12 mm can be welded. As a result, the cost for the production and the installation of the backing metal (made of copper) becomes unnecessary. In addition, it becomes possible to readily and favorably weld even an object to be welded which can not be applied with a backing metal, such as a pipe or a vessel.

According to the third to sixth aspects of the present invention, since plasma welding of a carbon steel is conducted by using a welding torch in which a center gas comprising an inert gas is allowed to flow and a mixed gas containing 0.5 to 2% by volume of a carbon dioxide gas in argon or a mixed gas containing 0.5 to 6% by volume of oxygen in argon is allowed to flow as an outer gas, a deep weld can be created, keyhole welding can be conducted, and the penetration bead can be stabilized. For this reason, there is no need of applying a backing metal, and a carbon steel material having a thickness of 6 mm to 10 mm can be welded. As a result, the cost for the production and the installation of the backing metal (made of copper) becomes unnecessary. In addition, it becomes possible to readily and favorably weld even an object to be welded which can not be applied with a backing metal, such as a pipe or a vessel.

BRIEF DESCRIPTION OF THE DRAWINGS

FIG. 2 shows photographs of the results of Example 1.

FIG. 3 shows photographs of the results of Example 3.

FIG. 4 shows photographs of the results of Example 3.

DESCRIPTION OF THE REFERENCE SYMBOLS

Figure 1:
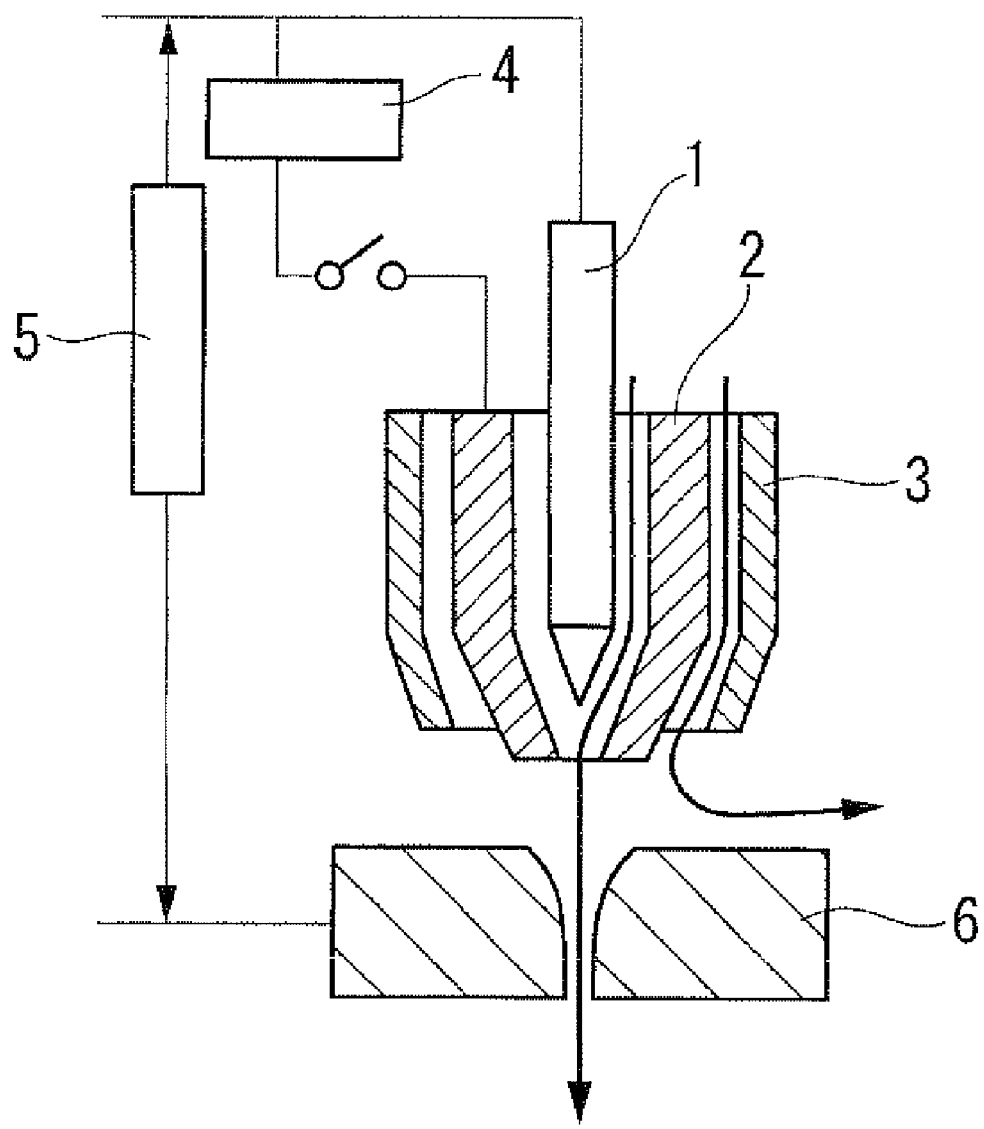
FIG. 1 is a schematic diagram illustrating a plasma welding torch of the present invention.

The reference symbols shown in these figures are defined as follows: 1 represents a tungsten electrode; 2 represents an insert tip; and 3 represents a shield cap.

BEST MODE FOR CARRYING OUT THE INVENTION

First and Second Embodiments of this Invention

In the first and second embodiments of this invention, when conducting plasma welding with use of, for example, a plasma welding torch shown in FIG. 1, a center gas comprising an inert gas such as argon or helium, or a mixed gas thereof, is allowed to flow into a gap between the tungsten electrode 1 and the insert tip 2, and an outer gas comprising a mixed gas containing 0.5 to 2% by volume, preferably 0.6 to 2% by volume, of a carbon dioxide gas, and 98 to 99.5% by volume, preferably 98 to 99.4% by volume, of an inert gas such as argon or helium, or a mixed gas containing argon and helium, is allowed to flow into a gap between the insert tip 2 and the shield cap 3.

The first and second embodiments correspond to the first and second aspects mentioned above.

In the first and second embodiments of this invention, such a combination of the center gas and the outer gas provides an effect of creating a deep weld, and enabling to stabilize a penetration bead.

In cases where the carbon dioxide gas concentration in the outer gas is lower than 0.5% by volume or higher than 2% by volume, the width of the penetration bead becomes irregular and the bead becomes rugged with meandering, so the bead becomes unstable.

In addition, in cases where a mixed gas containing an inert gas and oxygen, or a mixed gas containing an inert gas and hydrogen, is used as the outer gas, the width of the penetration bead becomes irregular and the bead becomes rugged with meandering, so the bead becomes unstable.

In plasma welding, although the point of using an inert gas as the center gas has been known, the point of using a mixed gas containing 0.5 to 2% by volume of a carbon dioxide gas and 98 to 99.5% by volume of an inert gas as the outer gas has not been known.

In TIG welding, there has been a proposal of using such a mixed gas as the shielding gas. However, the principle of welding is different and the structure of the welding torch is also different, so the operation and effect are different.

In TIG welding, a mixed gas containing 0.5% by volume of a carbon dioxide gas in argon is sometimes used as the shielding gas. However, the function of the carbon dioxide gas of this case is to inwardly turn the convection of the molten pool so as to create a deep weld.

On the other hand, in the first and second embodiments of this invention, although the function of the carbon dioxide gas when using the mixed gas as the outer gas has not been elucidated enough, it can be suggested that the carbon dioxide gas may be able to lower the surface tension of the molten pool to thereby reduce the viscosity of the molten metal in the entire molten pool, by which a smooth keyhole can be created to favorably affect the penetration bead.

It is preferable to set the flow rate of the center gas at normally about 0.1 to 5 liters/minute although it varies depending on the welding condition, the type of the material to be welded, or the like. In addition, it is preferable to set the flow rate of the outer gas at normally about 5 to 20 liters/minute although it also varies depending on the welding condition, the type of the material to be welded, or the like.

A direct current is used as the welding current, although a pulsed current is preferred. It is desirable to set the pulsed current such that the waveform of the current be a rectangular wave, the pulse frequency be 20 to 100 Hz, the base current be 30 to 80 A, the peak current be 30 to 200 A, and the ratio of the peak period to the base period (pulse width) be 1:05 to 1:5, although the pulsed current is not to be limited to this range.

If the peak current is raised, the spread of the generated plasma arc can be concentrated, making it easy to create a keyhole. Thus, to raise the peak current is suitable for welding a stainless steel material having a large thickness.

The preferred range of the welding rate is normally about 3 to 10 cm/minute although it varies depending on the type and the thickness of the material to be welded, or the like.

The position of welding may be any one of downward, upward, and vertical. In the upward or vertical position, to lower the frequency of the pulsed current is advantageous for the prevention of dripping of the molten metal and the creation of a penetration bead.

It is desirable to set the inclination angle of the torch at about 0 to 30°.

The inner diameter of the front end part of the insert tip 2 of the welding torch is important as it affects the spread of the generated plasma arc, and it is appropriate to set at 5 mm or shorter, and preferably about 2 mm.

In addition, the material to be welded is not specifically limited, although a usual stainless steel material is used. A stainless steel material having a large thickness, for example, a stainless steel material having a thickness of 8 to 12 mm, can be applied as it helps to create a favorable keyhole.

Moreover, in the welding of the first and second embodiments of this invention, it is not always necessary during welding to apply a backing metal to the backside of the material to be welded. This is because the penetration bead is able to be stably created. For this reason, it becomes possible to favorably weld even a material which can not be applied with a backing metal such as a pipe or a vessel.

Third to Sixth Embodiments of this Invention

In the third to sixth embodiments of this invention, when conducting plasma welding of a carbon steel as a material to be welded with use of, for example, a plasma welding torch shown in FIG. 1, a center gas comprising an inert gas such as argon or helium, or a mixed gas thereof, is allowed to flow into a gap between the tungsten electrode 1 and the insert tip 2, and an outer gas comprising either one of the following two types of mixed gases is allowed to flow into a gap between the insert tip 2 and the shield cap 3.

1) a mixed gas containing 0.5 to 2% by volume, preferably 0.5 to 1% by volume, of a carbon dioxide gas with the balance of argon 2) a mixed gas containing 0.5 to 6% by volume, preferably 0.5 to 3% by volume, of oxygen with the balance of argon The third to sixth embodiments correspond to the third to sixth aspects mentioned above.

In the third to sixth embodiments of this invention, such a combination of the center gas and the outer gas provides an effect of creating a deep weld, enabling to conduct keyhole welding, and enabling to stabilize a penetration bead.

In cases where the carbon dioxide gas concentration in the outer gas is lower than 0.5% by volume or higher than 2% by volume, or in cases where the oxygen concentration is lower than 0.5% by volume or higher than 6% by volume, the width of the penetration bead becomes irregular and the bead becomes rugged with meandering, so the bead becomes unstable.

In addition, in cases where a mixed gas containing an inert gas and hydrogen is used as the outer gas, the width of the penetration bead becomes irregular and the bead becomes rugged with meandering, so the bead becomes unstable.

In plasma welding of a carbon steel, although the point of using an inert gas as the center gas has been known, the point of using either one of these two types of mixed gases mentioned above as the outer gas has not been known.

In TIG welding, there has been a proposal of using such a mixed gas as the shielding gas. However, the principle of welding is different and the structure of the welding torch is also different, so the operation and effect are different.

As mentioned above, in TIG welding, a mixed gas containing 0.5% by volume of a carbon dioxide gas in argon is sometimes used as the shielding gas. However, the function of the carbon dioxide gas of this case is to inwardly turn the convection of the molten pool so as to create a deep weld.

On the other hand, in the third to sixth embodiments of this invention, although the function of the carbon dioxide gas when using the mixed gas as the outer gas has not been elucidated enough, it can be suggested that the carbon dioxide gas may be able to lower the surface tension of the molten pool to thereby reduce the viscosity of the molten metal in the entire molten pool, by which a smooth keyhole can be created to favorably affect the penetration bead.

It is preferable to set the flow rate of the center gas at normally about 0.1 to 5 liters/minute although it varies depending on the welding condition, the type of the material to be welded, or the like. In addition, it is preferable to set the flow rate of the outer gas at normally about 5 to 20 liters/minute although it also varies depending on the welding condition, the type of the material to be welded, or the like.

A direct current is used as the welding current, although a pulsed current may be used. The current value is influenced by some factors such as the thickness and the type of the material to be welded, and the welding rate, although it is normally within a range of 100 to 300 A.

The preferred range of the welding rate is normally about 3 to 10 cm/minute although it varies depending on the type and the thickness of the carbon steel material, or the like.

The position of welding may be any one of downward, upward, and vertical. In the upward or vertical position, to lower the frequency of the pulsed current is advantageous for the prevention of dripping of the molten metal and the creation of a penetration bead.

It is desirable to set the inclination angle of the torch at about 0 to 30°.

The inner diameter of the front end part of the insert tip 2 of the welding torch is important as it affects the spread of the generated plasma arc, and it is appropriate to set at 5 mm or shorter, and preferably about 3.2 mm.

In addition, a usual carbon steel material is used for the material to be welded. A carbon steel material having a large thickness, for example, a carbon steel material having a thickness of 6 to 10 mm, can be applied as it helps to create a favorable keyhole. When a V-shaped or U-shaped groove is provided, there is no limitation of the thickness, provided that the root face is set to 10 mm or smaller.

Moreover, in the welding of the third to sixth embodiments of this invention, it is not always necessary during welding to apply a backing metal to the backside of the material to be welded. This is because the penetration bead is able to be stably created. For this reason, it becomes possible to favorably weld even a material which can not be applied with a backing metal such as a pipe or a vessel.

EXAMPLES

Hereunder, in order to verify the effect of the present invention, a property verification test was conducted by the following Examples.

Example 1

Plasma welding was conducted by the bead-on-plate method under the following welding conditions, using a stainless steel plate having a thickness of 8 mm, and the stability of the penetration bead was examined.
<Welding Conditions>
Welding mode: plasma welding (non-consumable electrode welding)
Welding base metal: SUS304 (in a thickness of 8 mm)
Welding method: plasma welding process (downward posture)
Electrode: 2% lanthanum oxide-containing tungsten φ 4.8 mm
Distance between center nozzle and base material: 3.5 mm
Inclination angle of torch: angle of advance at 20°
Welding current: peak current=120 A, Base current=50 A
Welding rate: 6 cm/min
Pulse width: 50%
Pulse frequency: 50 Hz
Inner diameter of nozzle: 2 mm
Backing metal: Not used The combination of the center gas and the outer gas as shown in 1) to 4) below was used. The symbol % means percent by volume in all cases.

1) Center gas: 100% Ar; Outer gas: a mixed gas containing 97 to 99.5% Ar and 0.5 to 3% $CO_2$
2) Center gas: 100% Ar; Outer gas: 100% Ar
3) Center gas: 100% Ar; Outer gas: a mixed gas containing 99 to 99.5% Ar and 0.5 to 1% $O_2$
4) Center gas: a mixed gas containing 93% Ar and 7% $H_2$; Outer gas: a mixed gas containing 93% Ar and 7% $H_2$ The gas combination of 1) corresponds to the first and second aspects of the present invention, and the gas combinations of 2) to 4) are all for the purpose of comparison. Moreover, the flow rate was set at 1.6 liters/minute for the center gas and 10 liters/minute for the outer gas in all cases.

The results are shown in FIG. 2. FIG. 2 shows photographs of the appearances of the surface beads and the penetration beads. The pass or fail was judged from these appearances.

Pass: the width of the penetration bead stays constant and stable without any meandering or ruggedness.

Fail: the width of the penetration bead is irregular and unstable with meandering and ruggedness.

The results of FIG. 2 showed that a stable penetration bead was able to be created when using a mixed gas containing 98 to 99.5% of argon and 0.5 to 2% of a carbon dioxide gas as the outer gas.

Example 2

Plasma welding was conducted by the bead-on-plate method under the following welding conditions, using a stainless steel plate having a thickness of 12 mm, and the stability of the penetration bead was examined. As a result, it was confirmed that a stable penetration bead was able to be created even in the stainless steel plate having a thickness of 12 mm.
<Welding Conditions>
Welding mode: plasma welding (non-consumable electrode welding)
Welding base metal: SUS304 (in a thickness of 12 mm)
Welding method: plasma welding process (downward posture)
Electrode: 2% lanthanum oxide-containing tungsten φ 4.8 mm
Distance between center nozzle and base material: 5 mm
Inclination angle of torch: angle of advance at 10°
Welding current: peak current=150 A, Base current=100 A
Welding rate: 6 cm/min
Pulse width: 20%
Pulse frequency: 20 Hz
Inner diameter of nozzle: 2 mm
Backing metal: Not used
Center gas: 100% Ar
Outer gas: Ar–1% $CO_2$
Center gas flow rate: 1.7 liters/minute
Outer gas flow rate: 15 liters/minute Example 3

Plasma welding was conducted by the bead-on-plate method under the following welding conditions, using a carbon steel plate having a thickness of 9 mm, and the stability of the penetration bead was examined.

<Welding Conditions>

Welding mode: plasma welding (non-consumable electrode welding)

Welding base metal: SS400 (in a thickness of 9 mm)

Welding method: plasma welding process (downward posture)

Electrode: 2% lanthanum oxide-containing tungsten $\phi$ 4.8 mm

Distance between center nozzle and base material: 5 mm

Inclination angle of torch: angle of advance at 4°

Welding current: 220 A

Welding rate: 15 cm/min

Inner diameter of nozzle: 3.2 mm

Backing metal: Not used

The outer gas as shown in 1) to 10) below was used. The symbol % means percent by volume in all cases. The center gas was 100% Ar in all cases.

1) Ar (conventional product)
Oxygen-mixed outer gas
2) Ar+0.5% $O_2$
3) Ar+1.0% $O_2$
4) Ar+2.0% $O_2$
5) Ar+3.0% $O_2$
6) Ar+4.0% $O_2$
7) Ar+5.0% $O_2$
8) Ar+6.0% $O_2$
9) Ar+7.0% $O_2$
Carbon-mixed outer gas
10) Ar+0.5% $CO_2$
11) Ar+1.0% $CO_2$
12) Ar+2.0% $CO_2$
13) Ar+3.0% $CO_2$ The flow rate was set at 2.22 liters/minute for the center gas and 15 liters/minute for the outer gas in all cases.

The results are shown in FIG. 3 and FIG. 4. FIG. 3 and FIG. 4 show photographs of the appearances of the penetration beads. The pass or fail was judged from these appearances.

Pass: the width of the penetration bead stays constant and stable without any meandering or ruggedness.

Fail: the width of the penetration bead is irregular and unstable with meandering and ruggedness.

The results of FIG. 3 and FIG. 4 showed that a stable penetration bead was able to be created when using a mixed gas containing 0.5 to 6% by volume of argon in oxygen, or a mixed gas containing 0.5 to 2% by volume of a carbon dioxide gas in argon, as the outer gas.

The invention claimed is:

1. An outer gas for plasma welding which is used in plasma welding of stainless steels in the thickness direction of said stainless steels with use of a plasma welding torch in which an insert tip is provided in the periphery of a tungsten electrode, a shield cap is provided in the periphery of this insert tip, a front end part of the tungsten electrode is located inside from a front end part of the insert tip, a center gas comprising an inert gas is allowed to flow into a gap between the tungsten electrode and the insert tip, and the outer gas is allowed to flow into a gap between the insert tip and the shield cap, wherein
the outer gas is a mixed gas containing 0.5 to 2% by volume of a carbon dioxide gas with the balance of an inert gas.

2. A plasma welding process comprising a step of conducting plasma welding of stainless steels in the thickness direction of said stainless steels with use of a plasma welding torch in which an insert tip is provided in the periphery of a tungsten electrode, a shield cap is provided in the periphery of this insert tip, a front end part of the tungsten electrode is located inside from a front end part of the insert tip, a center gas is allowed to flow into a gap between the tungsten electrode and the insert tip, and an outer gas is allowed to flow into a gap between the insert tip and the shield cap, wherein
an inert gas is used as the center gas, and a mixed gas containing 0.5 to 2% by volume of a carbon dioxide gas with the balance of an inert gas is used as the outer gas, when conducting said plasma welding.

3. A plasma welding process according to claim 2, wherein a material to be welded is not applied with any backing metal during plasma welding.

4. An outer gas for plasma welding which is used in plasma keyhole welding of carbon steels in the thickness direction of said carbon steels with use of a plasma welding torch in which an insert tip is provided in the periphery of a tungsten electrode, a shield cap is provided in the periphery of this insert tip, a front end part of the tungsten electrode is located inside from a front end part of the insert tip, a center gas comprising an inert gas is allowed to flow into a gap between the tungsten electrode and the insert tip, and the outer gas is allowed to flow into a gap between the insert tip and the shield cap, wherein
the outer gas is a mixed gas containing 0.5 to 2% by volume of a carbon dioxide gas with the balance of argon.

5. An outer gas for plasma welding which is used in plasma keyhole welding of carbon steels in the thickness direction of said carbon steels with use of a plasma welding torch in which an insert tip is provided in the periphery of a tungsten electrode, a shield cap is provided in the periphery of this insert tip, a front end part of the tungsten electrode is located inside from a front end part of the insert tip, a center gas comprising an inert gas is allowed to flow into a gap between the tungsten electrode and the insert tip, and an outer gas is allowed to flow into a gap between the insert tip and the shield cap, wherein
the outer gas is a mixed gas containing 0.5 to 6% by volume of oxygen with the balance of argon.

6. A plasma welding process comprising a step of conducting plasma keyhole welding of carbon steels in the thickness direction of said carbon steels with use of a plasma welding torch in which an insert tip is provided in the periphery of a tungsten electrode, a shield cap is provided in the periphery of this insert tip, a front end part of the tungsten electrode is located inside from a front end part of the insert tip, a center gas is allowed to flow into a gap between the tungsten electrode and the insert tip, and an outer gas is allowed to flow into a gap between the insert tip and the shield cap, wherein
an inert gas is used as the center gas, and a mixed gas containing 0.5 to 2% by volume of a carbon dioxide gas with the balance of argon is used as the outer gas, when conducting said plasma keyhole welding.

7. A plasma welding process according to claim 6, wherein a material to be welded is not applied with any backing metal during plasma keyhole welding.

8. A plasma welding process comprising a step of conducting plasma keyhole welding of carbon steels in the thickness direction of said carbon steels with use of a plasma welding torch in which an insert tip is provided in the periphery of a tungsten electrode, a shield cap is provided in the periphery of this insert tip, a front end part of the tungsten electrode is located inside from a front end part of the insert tip, a center gas is allowed to flow into a gap between the tungsten electrode and the insert tip, and an outer gas is allowed to flow into a gap between the insert tip and the shield cap, wherein
an inert gas is used as the center gas, and a mixed gas containing 0.5 to 6% by volume of oxygen with the balance of argon is used as the outer gas, when conducting said plasma keyhole welding.

* * * * *